US011816718B2

United States Patent
Zhao (10) Patent No.: US 11,816,718 B2
(45) Date of Patent: *Nov. 14, 2023

(54) HETEROGENEOUS GRAPH EMBEDDING

(71) Applicant: INTUIT INC., Mountain View, CA (US)

(72) Inventor: Runhua Zhao, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,401

(22) Filed: Dec. 29, 2022

(65) Prior Publication Data

US 2023/0132448 A1 May 4, 2023

Related U.S. Application Data

(63) Continuation of application No. 17/037,470, filed on Sep. 29, 2020, now Pat. No. 11,568,463.

(51) Int. Cl.
G06Q 30/0601 (2023.01)
G06F 16/2457 (2019.01)
G06N 20/00 (2019.01)

(52) U.S. Cl.
CPC ... *G06Q 30/0623* (2013.01); *G06F 16/24578* (2019.01); *G06N 20/00* (2019.01)

(58) Field of Classification Search
CPC .............. G06N 20/00; G06F 16/24578; G06Q 30/0623
See application file for complete search history.

(56) References Cited

U.S. PATENT DOCUMENTS

| 10,803,050 | B1 | 10/2020 | Salkola |
| 11,568,463 | B2* | 1/2023 | Zhao ................. G06F 16/24578 |
| 2017/0169351 | A1 | 6/2017 | Guo |
| 2019/0236464 | A1 | 8/2019 | Feinson |
| 2020/0226460 | A1 | 1/2020 | Bruss |
| 2020/0342006 | A1 | 10/2020 | Rossi |
| 2021/0103925 | A1 | 1/2021 | Dev |

FOREIGN PATENT DOCUMENTS

CN 108229964 6/2018

OTHER PUBLICATIONS

International Search Report dated Nov. 26, 2021 issued in PCT/US2021/045865.
Written Opinion dated Nov. 26, 2021 issued in PCT/US2021/045865.

* cited by examiner

*Primary Examiner* — Nicholas P Celani
(74) *Attorney, Agent, or Firm* — DLA PIPER LLP (US)

(57) ABSTRACT

A computer-implemented system and method for generating heterogeneous graph feature embeddings for feature learning and prediction. An application server may receive and process a plurality of feature datasets to generate a graph data structure comprising a plurality of interconnected transaction pairs. The application server processes the graph data structure to determine a first-order transaction pair corresponding to a maximum transaction frequency based on a user identifier; executes a jumping probability algorithm to process the graph data structure to determine a second-order transaction pair jumping from a first-order transaction pair; and generates a transaction sequence associated with the user identifier.

20 Claims, 8 Drawing Sheets

HETEROGENEOUS GRAPH EMBEDDING

CROSS REFERENCE TO RELATED APPLICATIONS

This application is a Continuation Application of U.S. application Ser. No. 17/037,470 filed Sep. 29, 2020. The entirety of the above-listed application is incorporated herein by reference.

FIELD OF THE DISCLOSURE

The present disclosure relates to generating heterogeneous graph feature embeddings for feature learning and prediction related to machine learning models.

BACKGROUND

Generating feature embeddings by transforming raw text into numerical vectors is a crucial component for machine learning models. This allows feature vector data to be directly fed to and understood by the machine learning models so that they may conduct various tasks such as e.g., feature prediction. As one example, the high dimensional feature data associated with financial transactions may include a plurality of transaction features such as e.g., user identifier, merchant zip code, and merchant industry type. These features may be used by a given model to generate recommendations and provide valuable information to the users related to the financial transactions. It may be desirable to use these features in other models. However, it is not easy to generate the underlying embeddings for transaction data due to the complex nature and high categorical dimensionality of the data. Learning high dimensional features within existing end-to-end learning models requires a vast amount of data and may not be feasible, especially for prediction tasks with small sample sets and or imbalanced labels. Even for prediction tasks with enough data samples to properly train the model, these "learned" feature embeddings focus on a very specific business target and are thus not applicable or shareable with other use cases (e.g., other models).

One known feature learning method (e.g., Node2Vec) can learn using low-dimensional representations of nodes on a graph and relies on data to the first degree (e.g., frequency of occurrence) to generate vector representations of the nodes within a homogeneous network. Since the homogeneous network may only have one set of user nodes that share the same characteristics, it is difficult for the method to learn from related multi-party connections. Moreover, the known feature learning method cannot be used to digest information in a bi-partite or tri-partite interrelationship network and cannot understand some complex transaction features (e.g., polarity, transaction type, tax code-based collection of accounts, etc.) associated with the interrelationship between two or more parties. As such, there is a need and desire for generating and providing feature embeddings that may represent interrelationships between two or more parties involved in financial transactions such that the feature embeddings can be understood by the machine learning models for various tasks and services.

BRIEF DESCRIPTION OF THE FIGURES

The foregoing and other aspects of embodiments are described in further detail with reference to the accompanying drawings, in which the same elements in different figures are referred to by common reference numerals. The embodiments are illustrated by way of example and should not be construed to limit the present disclosure.

DETAILED DESCRIPTION

Embodiments of the present disclosure provide techniques for generating, in an automatic and unsupervised manner. one or more feature embeddings that may be used to derive transaction relationships between different parties.

In one or more embodiments, the disclosed principles provide a practical technological solution to effectively generate feature representations (i.e., feature embeddings) using a heterogeneous graph by transforming high dimensional and categorical transaction features into low-dimensional vector representations. Embodiments disclosed herein provide a solution that generates a sequence of feature embeddings in a hierarchical manner based on interrelated subject nodes. In comparison to the state-of-the-art, the disclosed heterogeneous graph provides superior learning and performance via a meta-path feature embedding technique. Moreover, the disclosed principles demonstrate a good understanding and interpretability for the heterogeneous graph analysis. For example, with respect to financial transactions, the heterogeneous graph may connect parties such as users and merchants associated a service provider with completely different characteristics that would not have been connected using currently existing methodologies. Generating interconnected transaction pairs may include deriving and extracting features with relevant and understandable context and relationships between different transactions related to the same merchants or similar merchants corresponding to various transaction characteristics. Semantic sequences of interconnected transaction pairs for each of these parties can be generated. Generating, indexing and achieving feature embeddings of such relevant transaction pairs may optimize performance of a downstream prediction task. The generated feature embeddings can further cause machine learning or deep leaning tasks to provide faster and more accurate predictions. For example, one or more generated feature embeddings may be fed into machine learning models to generate predictions of categorical features associated with relevant transactions.

Embodiments of the present disclosure provide various improvements to, and advantages over, existing feature embedding technology for completing machine learning tasks. The feature embeddings generated in accordance with the disclosed principles can be directly applied to and or used in combination with any downstream model, cluster pipeline and or existing machine learning model or algorithm. The generated feature embeddings can be applied to improve the performance of an existing machine learning model and can be directly applied to machine learning algorithms to provide effective learning, more accurate feature prediction, computing efficiency, etc. The feature embeddings can be archived, indexed and versioned properly within one feature store associated with one or more online service and be consumed by leveraging these features with minimum training effort.

Figure 1:
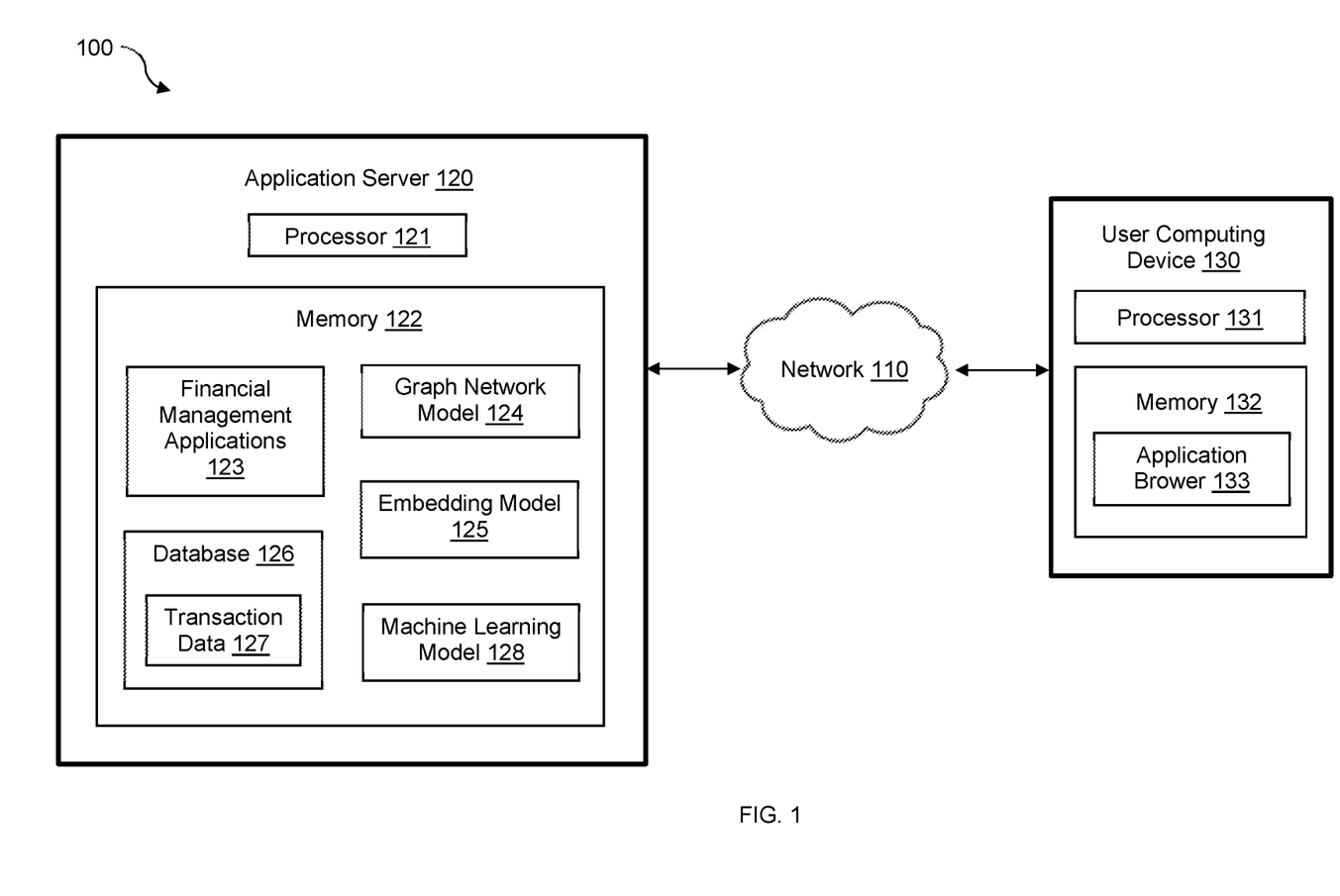
FIG. 1 illustrates an example computing system according to some embodiments of the present disclosure.

FIG. 1 illustrates an example computing system 100 for generating semantic sequences of transaction features and corresponding feature embeddings in accordance with the disclosed principles. The example computing system 100 includes an application server 120 (e.g., a server computing device or a server computer), a plurality of user computing devices 130 that may be communicatively connected to one another in a cloud-based or hosted environment by a network 110. Application server 120 may include a processor 121, memory 122 and communication interface for enabling communication over network 110. Application server 120 hosts one or more online software financial services or software products, which may be indicative of one or more applications 123 stored in memory 122. The one or more applications 123 (e.g., Intuit QuickBooks® online services and or applications) are executed by processor 121 for providing financial management services or providing one or more websites with services for users to manage their financial accounts and transactions. The one or more applications 123 (e.g., financial management applications) may continuously receive and update transaction data 127 from financial services or financial institutions via the network 110. Memory 122 may store a graph model 124, an embedding model 125, a machine learning model 128, and other program models, which are implemented in the context of computer-executable instructions executed by the processor 121 of application server 120 for implementing methods, processes, systems and embodiments described in the present disclosure. Generally, computer-executable instructions include software programs, objects, models, components, data structures, and the like that perform functions or implement particular data types. The computer-executable instructions may be stored in a memory communicatively coupled to a processor and executed on the processor to perform one or more methods described herein.

Network 110 may include the Internet and/or other public or private networks or combinations thereof. A user computing device 130 may include a processor 131, memory 132, and an application browser 133. For example, a user device 130 may be a smartphone, personal computer, tablet, laptop computer, mobile device, or other device. Users may be registered customers of the one or more online applications 123. Each user may create a user account with user information for subscribing and accessing a particular product or service provided by application server 120. Each user account is stored as a user profile or user dataset described below.

Database 126 may be included in the application server 120 or coupled to or in communication with the processor 121 of the application server 120 via the network 110. Database 126 is configured to store and update large amounts of transaction data 127 associated with millions of users and merchants or business entities. Users may make transactions with the same or different merchants for many and different types of products and services. Database 126 may continuously receive, and update transaction data received from financial services or financial institutions via the network 110. Database 126 may store a plurality of user profiles or user feature data along with user behaviors while the users interact with application server 120 regarding various products or services through the user computing devices 130.

Transaction data 127 is a feature data store configured to store and update a plurality of high dimensional and categorical transaction feature datasets. Each feature dataset may be associated with a transaction between a user and a merchant or between a unique user identifier (e.g., user ID) and a unique merchant identifier (e.g., merchant ID). Each transaction feature dataset includes a plurality of features or characteristics associated with a transaction between a user and a merchant. Each semantic feature or characteristic may be represented by a number, natural language words, terms, text, phrases, sentences, etc. For example, each feature dataset may include a user ID, merchant ID, merchant category, payment method, transaction amount, transaction time, product information, etc.

Each user is associated with a group of user transaction characteristics and semantic features shared by a plurality of users. The user transaction characteristics may include user features such as e.g., a user ID, user name, zip code, city, state, IP address, payment method or payment type, transaction polarity, payment transaction accounts, Schedule C (form 1040) type, and any other features or characteristic associated with a user or shared with multiple users. In one or more embodiments, a user may make transactions with different merchants in a same merchant category for similar purposes.

Each merchant is associated with a group of transaction characteristics shared by a plurality of users. The merchant transaction characteristics may include merchant features such as e.g., merchant entity name, industrial background, number of employees, zip code, city, state, type of products, type of merchant category, tax account, Standard Industrial Classification (SIC) code, Provider Merchant Category Code (MCC), and any other features or characteristic associated with the merchant or shared by multiple merchants, etc. Merchants and users share many features in common. In one or more embodiments, a user may make different transactions with the same merchant for different purposes. Different users may share some features or characteristics when they make their transactions with merchants in the same category. High dimensional and categorical transactions may be analyzed based on transaction characteristics including e.g., a type of merchant category, transaction frequency during a given period, transaction payment method, transaction polarity, transaction channel, tax code based a collection of accounts, etc. Transaction characteristics may be associated with certain monetary definitions of user registered accounts with e.g., an online financial management service or software product such as when the users interact with a plurality of merchants. For example, the transaction characteristic referred to as "transaction polarity" may represent a money-in flow direction (e.g., Account Receivable, Asset, Income) transaction or a money-out flow direction (e.g., Account Payable, Expense, Liability) transaction.

In accordance with the disclosed principles, a large amount of transaction data can be represented as a plurality of pairs of interconnected relationships referred to as "transaction pairs" between users and merchants in a heterogeneous graph. As explained in more detail herein, a transaction pair can be viewed as a relationship between a user node and a merchant node linked by a transaction connection band or edge with certain characteristics.

Figure 2A:
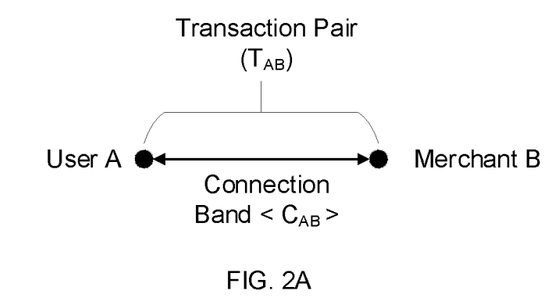
FIG. 2A illustrates an example transaction pair associated with a transaction in accordance with some embodiments disclosed herein.

FIG. 2A illustrates an example transaction pair TAB associated with one or more transactions between a user and a merchant. The illustrated transaction pair TAB includes a user node A and a merchant node B. One or more transactions between the user and merchant may be represented as a bi-directional transaction pair by connecting the user node A and merchant node B with a bi-directional connection band CAB. Each user node A may correspond to a user account identifier (e.g., user ID) associated with a group of user features or characteristics. Each merchant node B may correspond to a merchant ID associated with a group of merchant features or characteristics. Each connection band CAB represents transactions associated with one or more semantic transaction characteristics shared by a plurality of users. The semantic characteristic is a type of feature that may be selected from a group of common characteristics or tokens. The group of common characteristics or tokens may include e.g., a zip code, an IP address, a city, payment method, Schedule C (form 1040) type, and any other characteristic or attribute related to users and transactions.

Figure 2B:
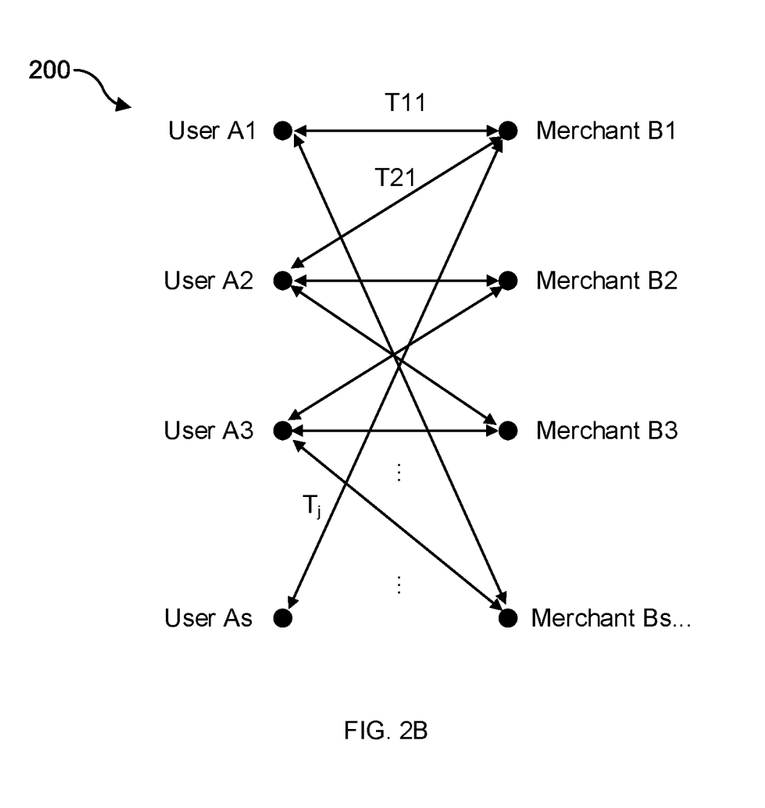
FIG. 2B illustrates an example heterogeneous graph including a plurality of interconnection transaction pairs in accordance with some embodiments disclosed herein.

FIG. 2B illustrate an example heterogeneous graph 200 in accordance with the disclosed principles. In one or more embodiments, the heterogeneous graph 200 may be used to generate semantic sequences for related transactions associated with certain characteristics. A heterogeneous graph 200 is different from a homogenous graph, which has only one type of node. Instead, the disclosed heterogeneous graph 200, may include a plurality of node types for different parties (e.g., users and merchants) and a plurality of bi-directional connection bands indicative of transactions between the parties. The nodes and connection bands therefore represent a graph data structure Nodes A1-As (collectively referred to as nodes Ai) may represent millions of users who register with one or more applications 123 and have transaction relationships with one or more merchants or payee entities represented by nodes Bi. When connected by corresponding bi-directional connection bands, user nodes A1-As and merchant nodes B1-Bs form a plurality of bi-directional interconnected transaction pairs or meta-paths between different parties represented on the graph 200. The heterogeneous graph 200 may include interrelated transactions between different users and the same merchant or between a user and different merchants. The heterogeneous graph 200 may represent the simplest relationship between users and similar merchants. In accordance with the disclosed principles, one or more transactions may be represented as a bi-directional transaction pair between a user node and a merchant node based on one or more shared characteristics.

Figure 3:
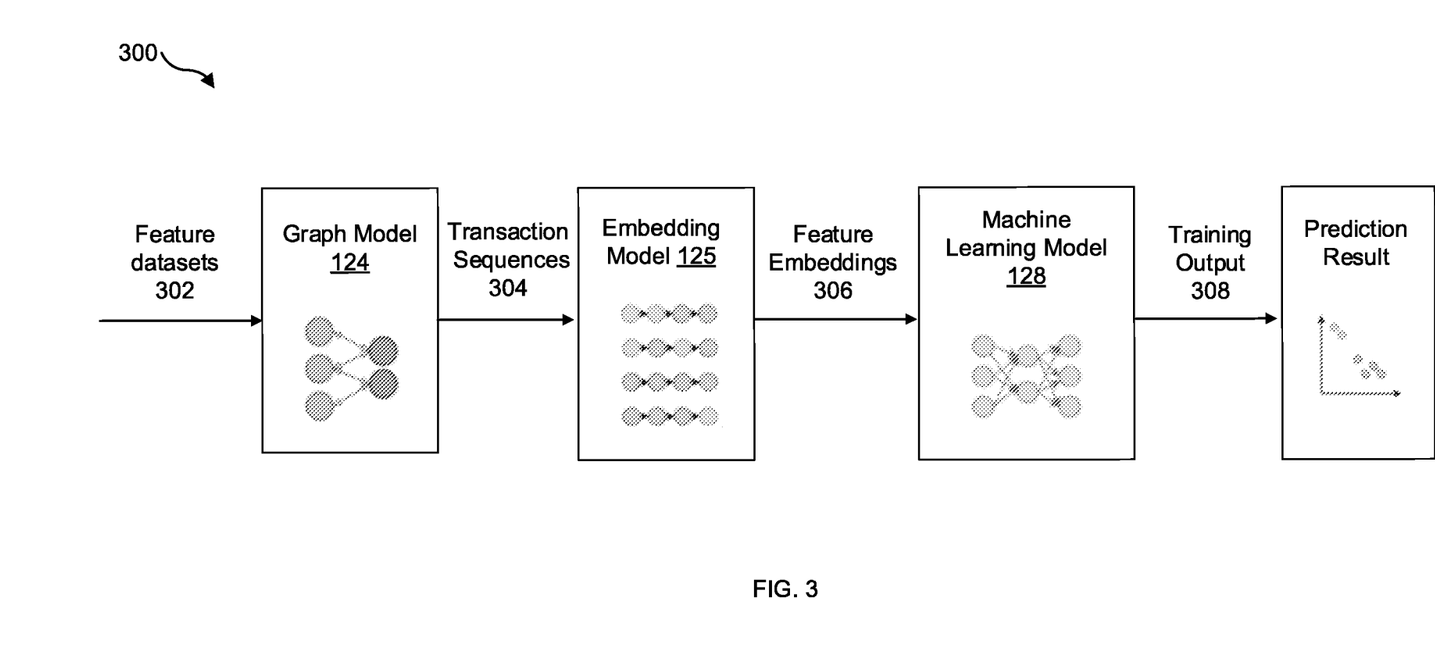
FIG. 3 illustrates a block diagram of an example graph feature embedding and learning system in accordance with some embodiments of the present disclosure.

FIG. 3 illustrates a block diagram of an example graph feature embedding and learning system 300 in accordance with the disclosed principles. The example system 300 includes a graph model 124, an embedding model 125, and a machine learning model 128. The example system 300 may be implemented as computer programs executed by the processor 121 of the application server 120 for implementing various processes and embodiments described herein. The graph model 124 receives input transaction feature datasets 302 from a database 126 and generates a heterogeneous graph including a plurality of transaction pairs (e.g., graph 200). The heterogeneous graph or a graph data structure may be constructed as described above with respect to FIG. 2B. Merchants in the heterogeneous graph may be grouped into one category based on precalculated similarity scores. Users in the graph may share a certain characteristic such as e.g., a zip code, payment method, etc. The shared characteristics between different transaction pairs may be used to identify related transaction pairs or transactions. As described below, the graph (or its data structure) may be used to generate semantic transaction sequences based on respective transaction frequencies to obtain most relevant and meaningful relationships between different transactions.

The graph model 124 may include a jumping probability algorithm executed by the processor 121 to process respective transaction frequencies corresponding to the transaction pairs to determine transaction sequences 304. Each transaction sequence 304 may include multiple orders of relevant transaction pairs connected to each other. The transaction sequences 304 are provided to the embedding model 125, which generates one or more corresponding feature embeddings 306. The feature embeddings 306 can be indexed, versioned and stored in the database 126 or a separate feature embeddings data store. The feature embeddings 306 can be used by any downstream machine learning model for leveraging these features with minimum training effort. For example, the feature embeddings 306 can be fed to the machine learning model 128, which generates a training output 308 for feature prediction, category recommendations, etc.

Figure 4A:
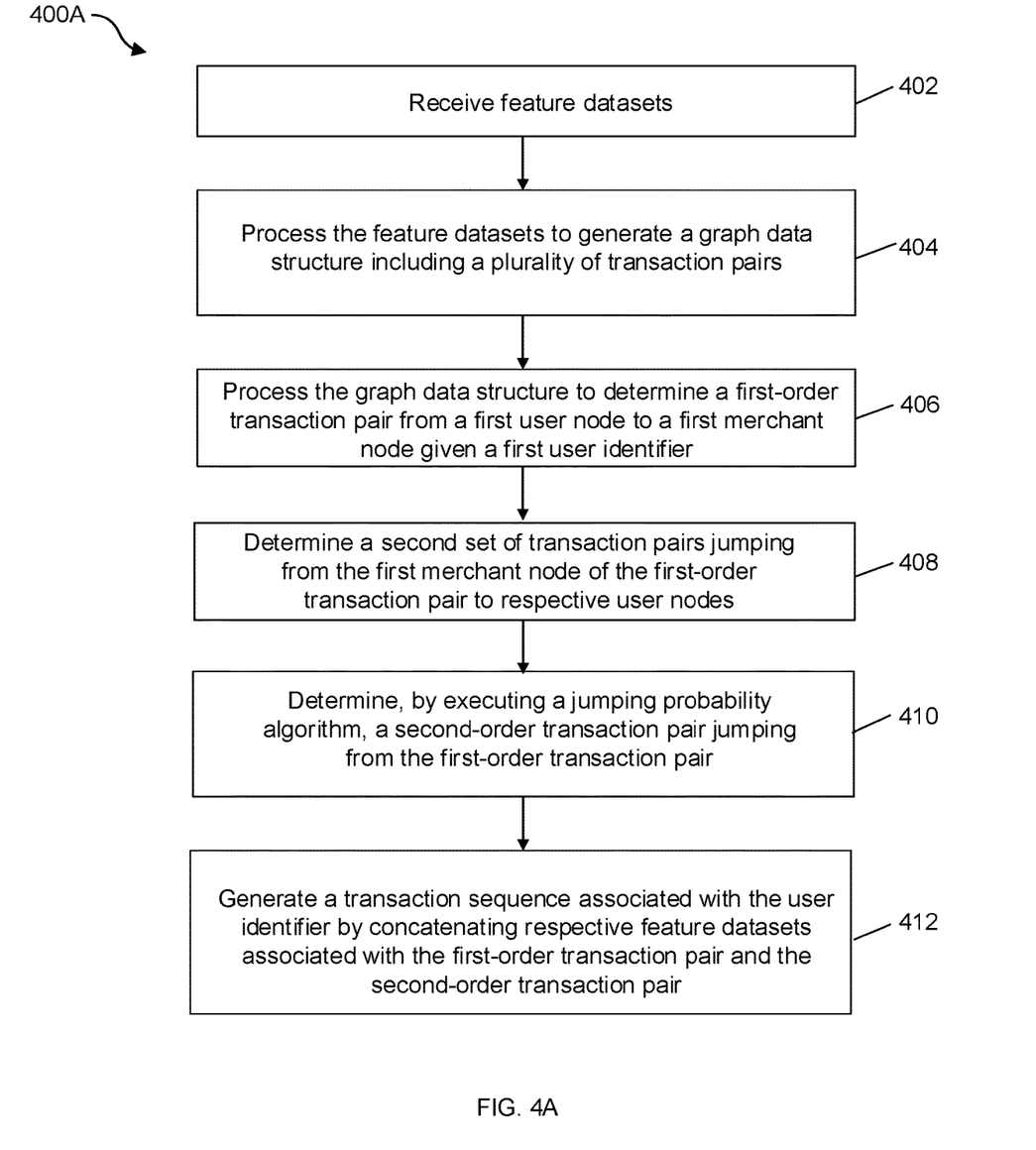
FIG. 4A is a flowchart illustrating an example method for processing transaction feature data to generate a sequence of transaction pairs in accordance with some embodiments disclosed herein.

FIG. 4A is a flowchart illustrating an example method 400A for processing transaction feature data to generate one or more semantic transaction sequences in accordance with some embodiments disclosed herein. The method 400A may be configured as one or more computer programs (e.g., applications 123) executed on the application server 120 or other computers, in which the systems, model components, processes, and embodiments described below can be implemented. The order of the operations described herein is not intended to be construed as a limitation, and any number of the described operations can be combined in any order and/or in parallel to implement the method 400A.

At 402, application server 120 may receive a plurality of input feature datasets 302 from database 126. Each feature dataset 302 is associated with a transaction between a user and a merchant. The user is represented by a user ID. Each merchant is represented by a merchant ID. Each feature dataset 302 may include a user ID, merchant ID, transaction amount, payment method, product information, transaction time, etc.

At 404, application server 120 may process the plurality of feature datasets 302 to generate a heterogeneous graph representing a graph data structure. The application server 120 may process the plurality of feature datasets 302 associated with a merchant category for identifying most relevant and meaningful relationships between different transactions. The application server 120 may process the plurality of feature datasets 302 to generate a graph data structure based on one or more transaction characteristics. With reference to FIGS. 2A and 2B, a heterogeneous graph 200 representing a graph data structure includes a plurality of transaction pairs each representing one or more transactions between a user and a merchant during a given period. Each transaction pair may be represented as a bi-partite feature sequence that connects a user node to a merchant node via a bi-directional connection band CAB in the graph. The set of merchant nodes represents a plurality of similar merchants that share a merchant category. Different merchants that provide similar products and services may be classified in one category based on predefined similarity scores among them. Each merchant node is associated with a merchant ID and a merchant feature dataset. The set of user nodes represents the plurality of users. Users may be grouped into different types or clusters of user transactions based on zip code, payment method, or any other transaction characteristics. Each user node is associated with a user ID and at least one characteristic or type of user feature described above. The connection band CAB of each transaction pair TAB represents one or more transaction characteristics such as a transaction frequency, transaction polarity, zip code, city, state, IP address, transaction channel, standard chart of account, or a combination thereof. In some embodiments, the connection band CAB of each transaction pair TAB may be configured to represent a frequency of transactions (i.e., transaction frequency Tf) between the user and the merchant during a given period. The transaction frequencies Tf between users and merchants may be used to identify the most relevant transactions in the graph by generating a sequence of multiple interconnected transaction pairs.

At 406, given a user identifier, a graph model 124 may be executed by the processor 121 to process the graph data structure to determine a first-order transaction pair having a maximum transaction frequency from a first user node associated with a given user identifier to a first merchant node. A first-order transaction pair can be determined based on one or more different transaction characteristics shared by the users and the transaction frequency from the first user node A1 to a first merchant node B1. For example, based on the first user ID, the graph model 124 may process the feature datasets 302 to analyze respective transaction datasets associated with a plurality of similar merchants in a category (e.g., "food and beverages").

Figure 5A:
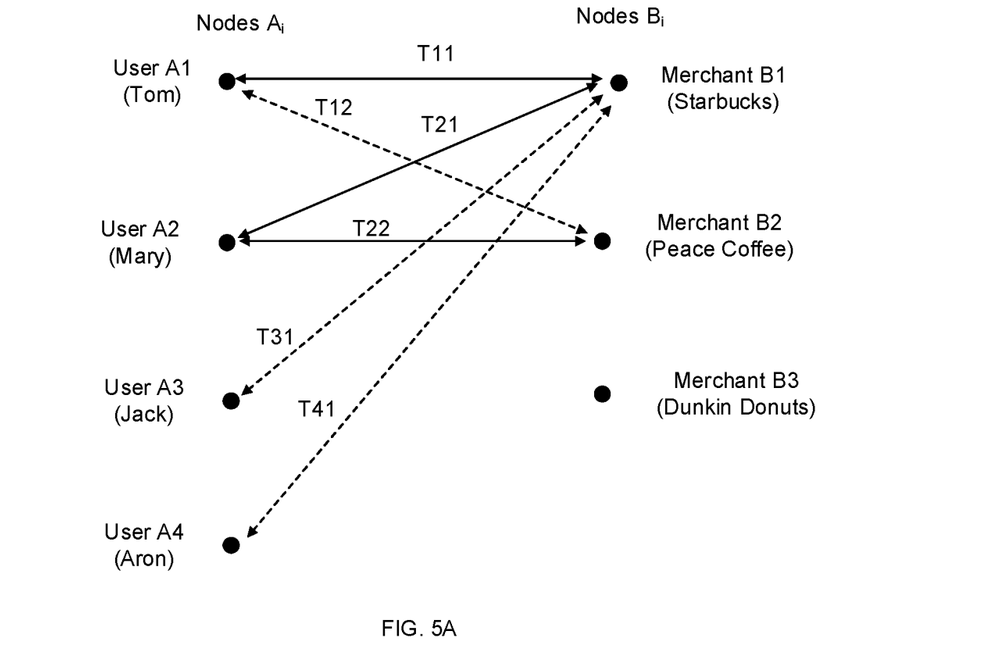
FIG. 5A illustrates a plurality of transaction pairs associated with multiple transactions in accordance with some embodiments disclosed herein.
Figure 5B:
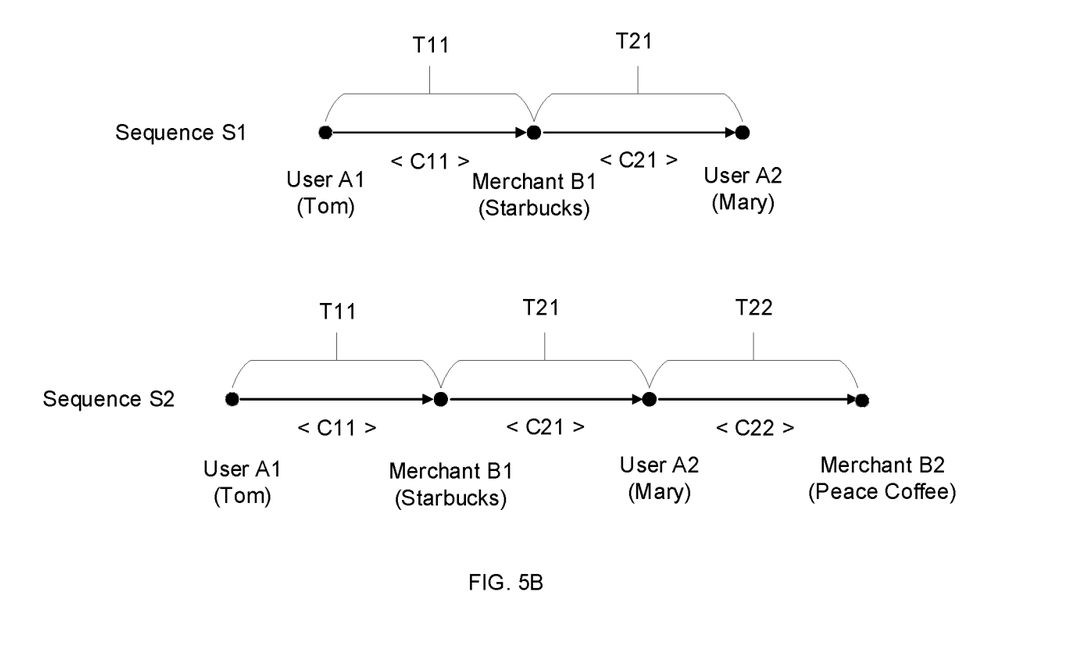
FIG. 5B illustrates an example generated interconnection sequence according to some embodiments disclosed herein.

Given a first user ID, the graph model 124 may be executed by the processor 121 to search the feature datasets 302 associated with a transaction characteristic (e.g., a payment method or a zip code) to determine a group of transaction pairs from the first user A1 to other merchants nodes B1-Bs. FIG. 5A illustrates an example of a plurality of transaction pairs associated with multiple transactions. As shown in FIG. 5A, a first group of transaction pairs (T11 and T12) may start from the first user A1 and make connections to different merchant nodes Bs (B1 and B2). In some embodiments, the graph model 124 may choose a first transaction pair corresponding to the maximum transaction frequency. FIGS. 5A-5B show that a first-order transaction pair T11 associated with a transaction characteristic (e.g., a payment type) may correspond to the maximum transaction frequency of the first group of transaction pairs (T11 and T12). As shown in FIG. 5B, the first-order transaction pair T11 represents one or more transactions made by a first user A1 "Tom" to a merchant point B1 "Starbucks" via a connection band C11 during a given period.

In some embodiments, the transaction characteristic may be modified to generate different related sequences and corresponding feature embeddings for different prediction tasks. For example, the transaction characteristic may be modified from a payment method to a zip code. A graph model 124 may process the graph data structure to determine respective customized first-order transaction pairs for the first user so that transaction relationships between the first user and other users with the same and or similar merchants can be derived based on the modified transaction characteristic (e.g., zip code). For example, by modifying the transaction characteristic, the graph model 124 may process the feature datasets to generate a modified graph data structure comprising a plurality of modified transaction pairs. Further, using the modified graph data structure, different semantic transaction sequences may be generated for a user and may lead to one or more modified feature embeddings for respective user transaction feature datasets having a different transaction characteristic.

At 408, the graph model 124 may determine a second set of transaction pairs (T21, T31 and T41) jumping from the first merchant node (B1 in FIG. 5A) of the first-order transaction pair A11 to other user nodes (e.g., A2, A3, and A4 in FIG. 5A). The second set of transaction pairs may be determined based on a ranking of transaction frequencies of the second set of transaction pairs. In the illustrated example, the other user nodes (e.g., A2, A3, and A4 in FIG. 5A) are associated with the same transaction characteristic as user node A1. In accordance with the disclosed principles, it is desirable to determine a second-order transaction pair that the first-order transaction pair T11 will most likely jump to from the first merchant node B1. The second-order transaction pair may be determined by weighing transaction frequencies of the second set of transaction pairs (T21, T31 and T41).

At 410, the graph model 124 includes a jumping probability algorithm executed by the processor 121 to process respective transaction frequencies of the second set of transaction pairs to determine a second user node and a second-order transaction pair corresponding to a maximum weighted frequency probability score. For example, as illustrated in FIG. 5A, the second-order transaction pair T21 may jump from the first merchant node B1 to a second user node A2 and correspond to the maximum weighted frequency probability score of the second set of transaction pairs (T21, T31 and T41) in FIG. 5A.

Figure 4B:
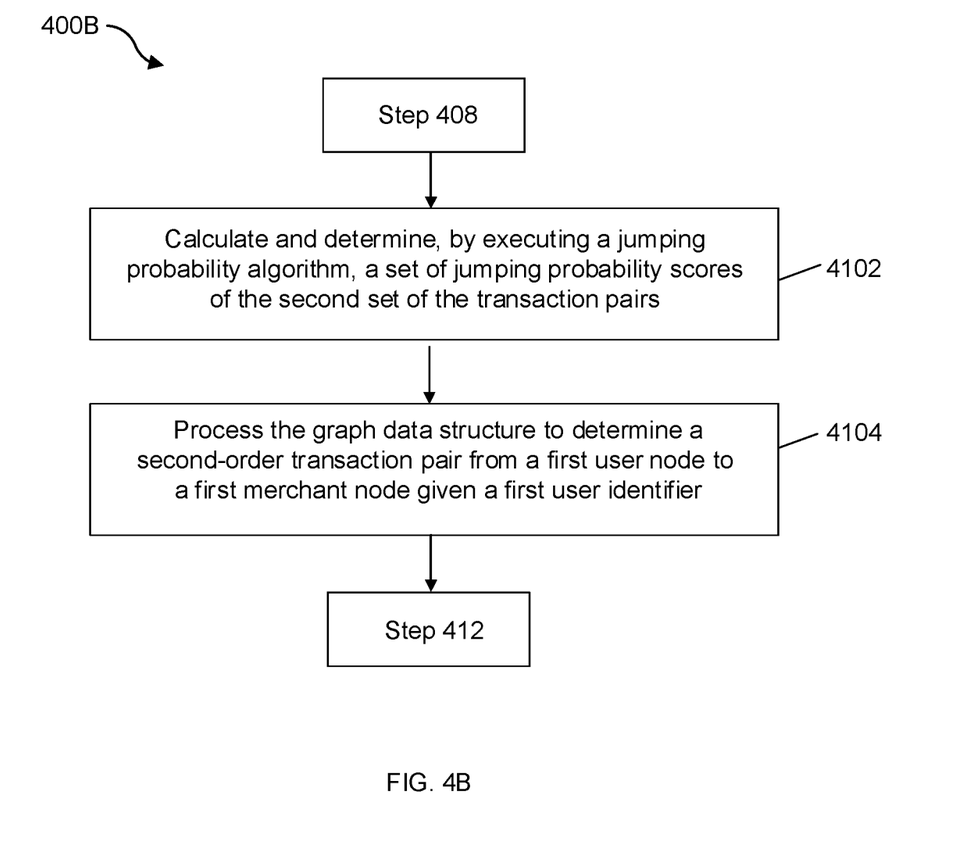
FIG. 4B is a flowchart illustrating an example method for implementing a jumping probability algorithm for generating a semantic sequence of transaction pairs in accordance with some embodiments disclosed herein.

FIG. 4B is a flowchart illustrating an example process 400B for implementing the jumping probability algorithm to determine a second user node and second-order transaction pair corresponding to a maximum weighted frequency probability score in accordance with some embodiments.

At 4102, the jumping probability algorithm is executed by the processor 121 to calculate and determine a set of jumping probability scores for the second set of transaction pairs (T21, T31 and T41) from the first merchant node B1 to the other user nodes (e.g., A2, A3, and A4 in FIG. 5A).

In the heterogeneous graph disclosed herein, a jumping probability or a jumping probability score P(i) may be determined to assess a jump from one transaction pair associated with one transaction to another transaction pair associated with a different transaction from a shared node based on each respective transaction frequency of the second set of transaction pairs and various predefined transaction hyper-parameters described below. In some embodiments, the jumping probability can be determined by equation (1).

$$P(i) = T_f^{Tp} * F_{cm} \qquad (1)$$

For equation (1), the parameter Transaction_Count Tf represents transaction frequency of the transactions made by a user to a merchant during a given period; the parameter Transformation_Power Tp represents a root function with a value of 0.5 (i.e., a square root function); and the parameter Criteria Match Factor Fcm represents a predefined hyper-parameter associated with a type of payment method, such as credit card, debit card, etc. For example, Criteria Match Factor Fcm may be defined to have a value of "2" for a credit card payment, a value of "1" for a debit card payment, and some other values for other corresponding payment methods.

In the illustrated example shown in FIGS. 5A-5B, the first user A1 "Torn" visits the first merchant B1 "Starbucks" in the first-order transaction pair T11. A second set of transaction pairs (T21, T31 and T41) may represent transactions from the first merchant B1 "Starbucks" to different user nodes A2 "Mary", A3 "Jack" and A4 "Aron." As illustrated in Table 1, the second set of transaction pairs (T21, T31 and T41) each correspond to a transaction frequency Tf of 100, 100, and 1, respectively. Mary and Aron use the credit card payment and Jack uses the debit card payment. Based on the jumping probability algorithm, the set of jumping probability scores for the second set of the transaction pairs may be determined by multiplying the predefined hyper-parameter by a square root of each respective transaction frequency of the corresponding transaction pair. the jumping probability scores P(i) for the second set of transaction pairs (T21, T31 and T41) may be determined as illustrated in Table 1.

TABLE 1

| Transaction Pair | User A | Merchant B (Payee) | Transaction Frequency ($T_f$) | Criteria Match Factor ($F_{cm}$) | Jumping probability P(i) | Weighted frequency probability score W(i) |
|---|---|---|---|---|---|---|
| T21 | Mary A2 | Starbucks B1 | 100 | 2 | 20 | 62.5% |
| T31 | Jack A3 | Starbucks B1 | 100 | 1 | 10 | 31.3% |
| T41 | Aron A4 | Starbucks B1 | 1 | 2 | 2 | 6.3% |

At 4104, the jumping probability algorithm may calculate a sum of the jumping probability scores P(i) of the identified transaction pairs to determine a second-order transaction pair as follows. The jumping probability algorithm may further calculate a weighted frequency probability score W(i) based on equation (2):

$$W(i) = 1 - \frac{p(i)}{\sum_{i=0}^{n} p(i)} \quad (2)$$

The jumping probability algorithm may further determine a maximum weighted frequency probability score based on respective jumping probability scores P(i) for the second set of transaction pairs. As shown in Table 1, the second user node of the second-order transaction pair may be determined to be user node A2 "Mary". Referring to FIGS. 5A and 5B, based on the result of executing the jumping probability algorithm described above, the second user node A2 and the second-order transaction pair T21 correspond to the maximum weighted frequency probability score.

Referring again to FIG. 4A, at 412, the processor 121 may determine a semantic transaction sequence by combining a first transaction pair T11 with the second transaction pair T21. FIG. 5B illustrates a first example semantic sequence S1 as:

User A1 "Tom"<C11> Merchant B1 "Starbucks"<C21> User A2 "Mary"

A semantic transaction sequence associated with the user identifier may include respective feature datasets associated with the first-order relationship pair and the second-order relationship pair. Based on the determined second-order transaction pair T21 from the first merchant B1 and a corresponding second user node A2, the processor 121 may iteratively execute a jumping probability algorithm to identify a third-order transaction pair in which the second user A2 "Mary" in FIG. 5A is mostly likely jump to. The jumping probability algorithm may be executed to search Mary's transactions with a group of merchants. The jumping probability algorithm may be executed to determine a merchant B2 "Peace Coffee" with which Mary has the maximum weighted frequency probability score of a third group of transaction pairs. For example, FIG. 5B illustrates another example semantic transaction sequence S2 by combining three interconnected transaction pairs T11, T21 and T31.

User A1"Tom"<C11> Merchant B1"Starbucks"<C21> User A2"Mary" <C31> Merchant B1 "Peace Coffee"

The jumping probability algorithm may be executed by the processor 121 to generate a plurality of interconnected transaction pairs crossing a number of layers through multiple iterative processes of steps 408, 4102, 4104, and 410 to gradually increase relationships by connecting most relevant transactions associated with similar merchants in the heterogeneous graph 200. The jumping sequences of transaction pairs can be derived to include most relevant transaction pairs and transaction features to extend relationships between user nodes and merchant nodes in the heterogeneous graph 200. In some embodiments, the number of orders of generating a sequence of transaction pairs may be chosen to be 10 in processes 400A and 400B to extend relationships for connecting users and merchants with transactions associated with similar merchants in the same merchant category.

With a plurality of semantic feature sequences of transaction pairs generated for different users corresponding to different shared characteristics, application server 120 may perform a random sampling process to find the best meta-path with properties associated with respective jumps between related transaction pairs. For example, if a sequence is generated with respect to a merchant name, a relationship between these coffee shop brands may be created, even though they share nothing in common by their identifiers. In some embodiments, the merchant node may be switched with the user node to develop the jumping sequences of transaction pairs.

Once enough generated sequences are obtained, the corresponding user identifier and merchant identifier features can be swapped with the corresponding feature the user wishes to the model to learn so as to leverage existing machine learning algorithms (e.g., CBOW (Continuous Bag of Words) or skip-gram algorithms) to train the feature embeddings. Skip-gram is a reverse of CBOW algorithm and used to predict the context word for a given target word.

Another benefit of this approach is that the disclosed principles can simply generate random walk sequences on top of the existing graph when a new user or merchant appears.

Figure 6:
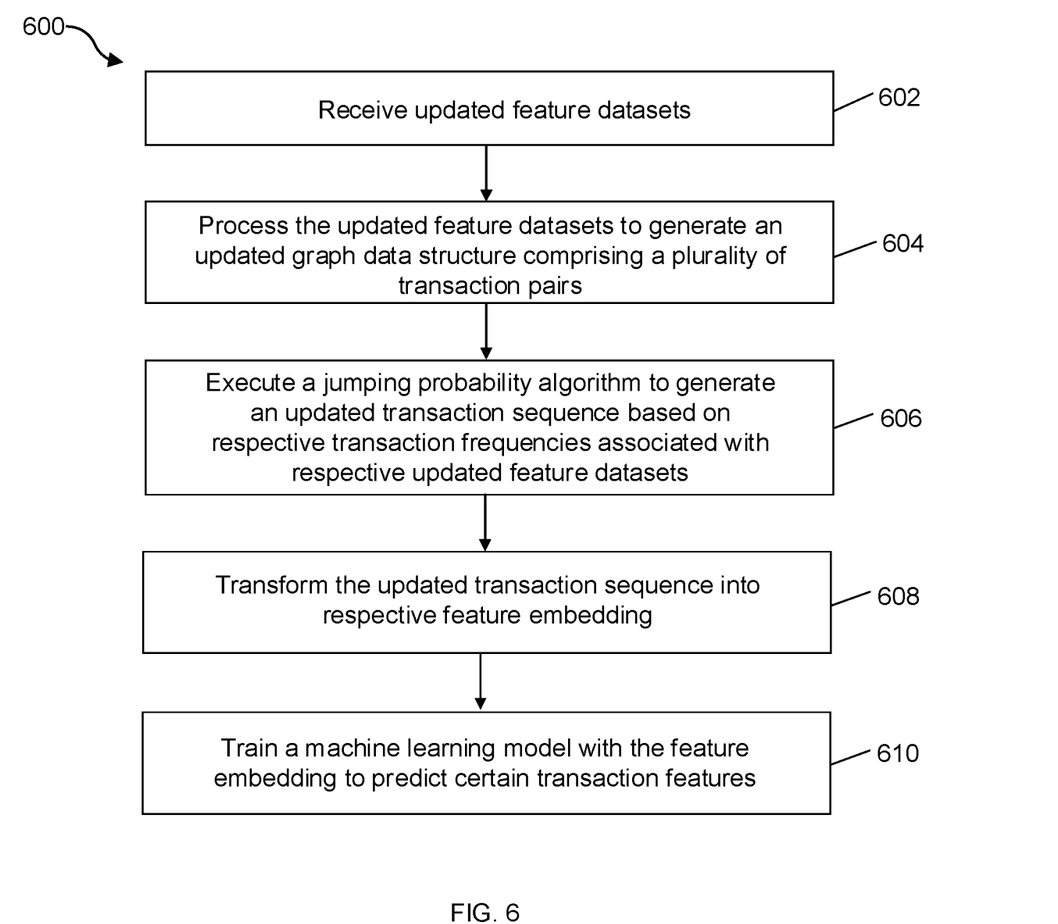
FIG. 6 is a flowchart illustrating an example method for generating graph feature embedding and learning system according to some embodiments of the present disclosure.

FIG. 6 is a flowchart illustrating an example process 600 for generating a feature embedding and applying the feature embedding to a machine learning system according to some embodiments of the present disclosure. The process 600 may be configured as computer programs (e.g., software) executed on one or more computers or servers including application server 120, in which the models, processes, and embodiments described below can be implemented. The example process 600 may be leveraged into live production in a practical application and integrated into one or more applications 123 and implemented in the example system 300 described above.

At 602, the application server 120 may receive a plurality of updated feature datasets from database 126. The updated feature datasets may be generated based on the transactions updated in real time.

At 604, based on the processing of method 400, the application server 120 may process the updated or modified feature datasets to generate an updated or modified graph data structure comprising a plurality of transaction pairs. The application server 120 may process the modified graph data structure based on a different user identifier to determine at least two interconnected transaction pairs to generate a modified semantic transaction sequence.

At 606, application server 120 may execute a jumping probability algorithm to generate an updated or modified semantic transaction sequence based on respective transaction frequencies associated with respective updated feature datasets.

At 608, application server 120 may execute an embedding model to transform the updated or modified semantic transaction sequence into a modified feature embedding. The generated feature embedding may be indexed, versioned and stored with respective user identifier and merchant identifier and stored in a database 126 or a separate feature embedding data store. Application server 120 may generate a plurality of feature embeddings by modifying the transaction characteristic or the merchant category. The generated feature embeddings can be used by any downstream machine learning models for leveraging these features with minimum training effort.

It may be important to store the generated feature embeddings and extract them for feeding into a downstream machine learning model application and or prediction model accurately and efficiently. For example, the application server 120 may specify one or more physical addresses to store the feature embeddings in the database 126 of the memory 122 such that the feature embeddings are indexed to the one or more physical addresses of the memory 122. Extracting data of the stored feature embeddings may be performed by looking up the feature embeddings based on the indexed physical addresses instead of the original feature name so as to avoid going through or searching the entire feature space to find the required feature embeddings. The embodiments described herein therefore improve the efficiency and accuracy of extracting the feature embedding from a data store and feeding the data into downstream machine learning models.

At 610, the generated feature embedding may be provided and fed to a machine learning model to predict certain transaction features. The processor 121 may train the feature embedding using machine learning algorithms such as skip-gram and CBOW to generate the training output for feature prediction, category recommendation, etc. The skip-gram algorithm may be applied to the feature embedding to generate corresponding feature prediction and classification. The generated prediction of category features may be used to generate a recommendation report associated with a user account which a user registers with an online financial management service or software product for interacting with a plurality of merchants.

Embodiments of the present disclosure provide a new approach for generating feature embeddings in an automatic and unsupervised manner. One or more feature embeddings can be generated for each user based on different transaction characteristic for transactions related to merchants corresponding to various categories. Moreover, the generated semantic transaction sequences can be consumed as is to help lump similar transactions together, provide categorization recommendation for one or more applications 123. The generated feature embeddings can be used as part of the model with no need to spend extra parameter space to train these features. The generated feature embeddings can be labeled, indexed, stored and versioned properly within the feature database 126 and later be consumed by any downstream model/cluster pipeline leveraging these features with minimum training effort. The feature embedding generated using this solution may be used in machine learning models in various transaction data management platforms to provide different solutions, such as transaction categorization, cash flow forecasting, and fraud detection, etc.

Based on the predicted category type, the online financial management service may summarize the model learning results, generate an account report and provide the user with the high-level information and valuable insight associated with the user's account. For example, the embodiments described herein may recommend a list of similar merchants based on the similarity of merchant embeddings if the users seek potential supply-chain sources to replace or balance its existing merchants to mitigate a sole-source risk.

Embodiments of the present disclosure provide several advantages and improvements the technical fields of transaction feature data processing and feature relationship embedding. For example, the embodiments described herein: 1) use case agnostic feature embedding generation; 2) provide a unique feature method for any high dimensional feature cross business sectors and within a service provide management platform; 3) provide customizable methods to generate a specific feature embedding tailored to user's task at hand; 4) provide feature a embedding generated based on a understandable transaction semantic relationship based generating, instead of feeding the raw feature into the model by itself; and 5) require less computation power and sample size requirement for downstream model convergence. For example, the disclosed processes can be used for a small data sample modeling project, which may increase model performance by including high dimensional features. An alternative solution for medium to large size data sample modeling projects may allow them to converge faster with less sample size and computation power requirements. It also accelerates a service provider's Artificial Intelligence (AI) development speed and improves its rigor by providing a path towards creating a standardized transaction feature data store.

The advantages of the disclosed principles include providing one or more customized feature embeddings with most relevant relationships between different transactions, providing understandable feature embeddings for machine learning tasks by a lightweight integration into the existing model pipeline, and further providing significant improvements in performance. For example, the disclosed methods can be implemented to support downstream modeling projects and thus provide accurate predictions so that the financial institution can provide better service/personalized service tailored to a specific user. The disclosed methods can be implemented for transaction categorization tasks to improve the performance of automatic categorizing transaction for the user. For example, when users run their profit and loss report or cash flow report, they can make better judgment calls for their business. The disclosed methods can be implemented for a smart money fraud detection service to certainly to reduce merchant and service provider's fraud related loss by leveraging the disclosed processes and embodiments into a live production as described in the process 600.

In a practical example, a user may have 100 transactions in its registered account from various merchants or other parties. The user needs to know whether the types of the transactions are personal-related transactions or business-related transactions. The embodiments described herein may mitigate the user's activities to find out its transaction details by integrating information from the user's historical transaction records and other users' transaction records to generate feature representations for each user and each merchant based on their corresponding attributes (e.g., zip code, transaction channel, etc.). The downstream prediction model may make an accurate prediction such as e.g., whether each transaction is a personal-related or a business-related transaction based on interrelated transaction information discussed above. It should be appreciated that this type of improvement cannot be achieved with existing models due to the lack of interrelationship information among related transitions.

The embodiments described herein provide computational efficiency and predictive accuracy for related machine learning tasks. The machine learning model may learn the transaction feature relationship between users and merchants more efficiently and may generate corresponding feature prediction and classifications more accurately. The embodiments described herein improve both model performance (e.g., a 41% to 57% categorization accuracy improvement was noted for Chart of Accounts Recommendation model) and computation efficiency. The embodiments described herein provide a real time solution with faster processing and delivery of transaction-related application services that satisfy user expectations and improve user experience when the users interact with their financial accounts for obtaining transaction related information to manage their registered accounts with the online financial management service.

Figure 7:
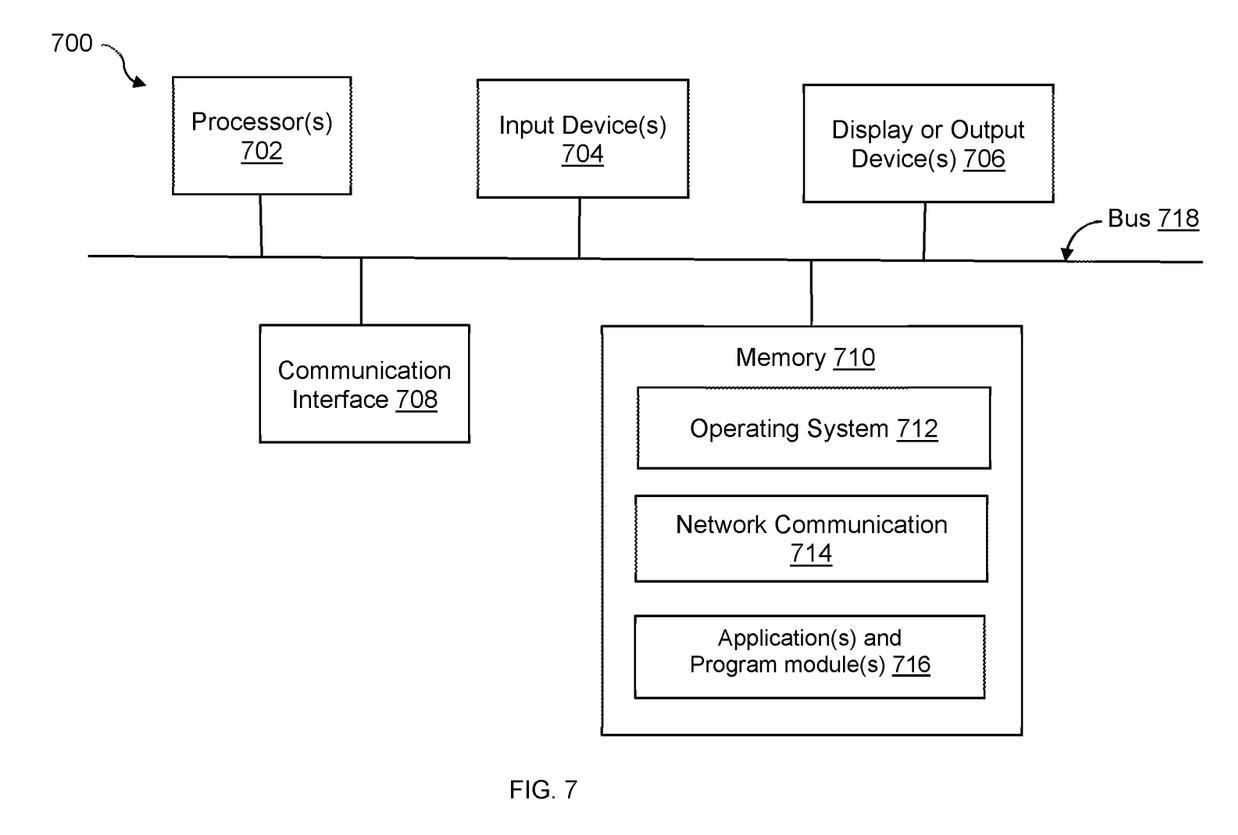
FIG. 7 is a block diagram of an example computing device according to some embodiments of the present disclosure.

FIG. 7 is a block diagram of an example computing device 700 that may be utilized to execute embodiments to implement processes including various features and functional operations as described herein. For example, computing device 700 may function as application server 120, and user computing device 130 or a portion or combination thereof. The computing device 700 may be implemented on any electronic device to execute software applications derived from program instructions for and as illustrated in Fogs 3-5, and includes but not limited to personal computers, servers, smartphones, media players, electronic tablets, game consoles, email devices, etc. In some implementations, the computing device 700 may include one or more processors 702, one or more input devices 704, one or more display devices or output devices 706, one or more communication interfaces 708, and memory 710. Each of these components may be coupled by bus 718, or in the case of distributed computer systems, one or more of these components may be located remotely and accessed via a network.

Processor(s) 702 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-transitory memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input devices 704 may be any known input devices technology, including but not limited to a keyboard (including a virtual keyboard), mouse, track ball, and touch-sensitive pad or display. To provide for interaction with a user, the features and functional operations described in the disclosed embodiments may be implemented on a computer having a display device 706 such as a CRT (cathode ray tube) or LCD (liquid crystal display) monitor for displaying information to the user and a keyboard and a pointing device such as a mouse or a trackball by which the user can provide input to the computer. Display device 706 may be any known display technology, including but not limited to display devices using Liquid Crystal Display (LCD) or Light Emitting Diode (LED) technology.

Communication interfaces 708 may be configured to enable computing device 700 to communicate with other another computing or network device across a network, such as via a wired connection, a wireless connection, or a combination of wired and wireless connections. For example, communication interfaces 708 may include an Ethernet interface, an optical interface, a coaxial interface, an infrared interface, a radio frequency (RF) interface, a universal serial bus (USB) interface, a Wi-Fi interface, a cellular network interface, or the like.

Memory 710 may be any computer-readable medium that participates in providing computer program instructions and data to processor(s) 702 for execution, including without limitation, non-transitory computer-readable storage media (e.g., optical disks, magnetic disks, flash drives, etc.), or volatile media (e.g., SDRAM, ROM, etc.). Memory 710 may include various instructions for implementing an operating system 712 (e.g., Mac OS®, Windows®, Linux). The operating system may be multi-user, multiprocessing, multitasking, multithreading, real-time, and the like. The operating system may perform basic tasks, including but not limited to: recognizing inputs from input devices 704; sending output to display device 706; keeping track of files and directories on memory 710; controlling peripheral devices (e.g., disk drives, printers, etc.) which can be controlled directly or through an I/O controller; and managing traffic on bus 718. Bus 718 may be any known internal or external bus technology, including but not limited to ISA, EISA, PCI, PCI Express, USB, Serial ATA or FireWire.

Network communications instructions 714 may establish and maintain network connections (e.g., software applications for implementing communication protocols, such as TCP/IP, HTTP, Ethernet, telephony, etc.). Application(s) and program modules 716 may include software application(s) and different functional program modules which are executed by processor(s) 702 to implement the processes described herein and/or other processes. For example, the program modules 716 may include a service management module for retrieving features associated with user transactions described herein for accessing program components and application processes. The program modules 716 may include but not limited to software programs, machine learning models, objects, components, data structures that are configured to perform tasks or implement the processes described herein. The processes described herein may also be implemented in operating system 712.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user device having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user computing device and server may generally be remote from each other and may typically interact through a network. The relationship of user computing devices and application server may arise by virtue of computer programs running on the respective computers and having a client-server relationship to each other.

Communication between various network and computing devices 700 of a computing system may be facilitated by one or more application programming interfaces (APIs). APIs of system may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. One or more features and functional operations described in the disclosed embodiments may be implemented using an API. An API may define one or more parameters that are passed between an application and other software instructions/code (e.g., an operating system, library routine, function) that provides a service, that provides data, or that performs an operation or a computation. A parameter may be a constant, a key, a data structure, an object, an object class, a variable, a data type, a pointer, an array, a list, or another call.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A processor implemented method comprising:
   processing, based on a transaction characteristic, a plurality of feature datasets comprising transactions with corresponding user identifiers and merchant identifiers to generate a graph data structure comprising a plurality of interconnected transaction pairs;
   processing the graph data structure to determine a first-order transaction pair corresponding to a transaction frequency associated with a first user identifier, the first-order transaction pair comprising a first user node associated with the first user identifier and a first merchant node associated with a first merchant identifier;
   processing the graph data structure to determine a second set of transaction pairs from the first merchant node to one or more additional user nodes based on a ranking of transaction frequencies associated with the first merchant node to the one or more additional user nodes;
   determining a second-order transaction pair from the first merchant node to a second user node based on each transaction frequency of the second set of transaction pairs and a corresponding predefined hyper-parameter; and
   generating a transaction sequence associated with the first user identifier by combining respective feature datasets associated with the first-order transaction pair and the second-order transaction pair.

2. The method of claim 1, wherein determining the second-order transaction pair comprises:

determining a set of jumping probability scores for the second set of transaction pairs based on each transaction frequency and the predefined hyper-parameter, each jumping probability scores for the second set of transaction pairs being determined by multiplying the predefined hyper-parameter by a square root of each respective transaction frequency of the corresponding transaction pair;

calculating a set of weighted frequency probability scores for the second set of transaction pairs based on each respective jump probability score and a sum of the set of the jumping probability scores; and determining, from the second set of the transaction pairs, the second-order transaction pair having a maximum standardized jumping probability score.

3. The method of claim 2, wherein the predefined hyper-parameter is a value associated with one of a set of payment methods.

4. The method of claim 1, wherein the processing further comprises:

processing the graph data structure to determine a third set of transaction pairs from the second user node to one or more additional merchant nodes based on respective transaction frequencies;

determining a third-order transaction pair from the second user node to a second merchant node based on each transaction frequency of the third set of the transaction pairs and the predefined hyper-parameter; and generating a second transaction sequence associated with the first user identifier by combining respective feature datasets associated with the first-order transaction pair, the second-order transaction pair and the third-order transaction pair.

5. The method of claim 1, wherein each transaction pair corresponds to a feature dataset and comprises a user node associated with a respective user identifier, a merchant node associated with a respective merchant identifier, and a connection band representing a corresponding transaction frequency.

6. The method of claim 1, wherein the processing further comprises:

executing an embedding model to transform the transaction sequence into a feature embedding;

indexing the feature embedding with the first user identifier; and storing the feature embedding in a database.

7. The method of claim 1, wherein the processing further comprises:

modifying the transaction characteristic to process the feature datasets to generate a modified graph data structure comprising a plurality of modified transaction pairs;

processing, based on a second user identifier, the modified graph data structure to determine at least two interconnected transaction pairs to generate a modified transaction sequence; and executing an embedding model to transform the modified transaction sequence into a modified feature embedding.

8. The method of claim 7, wherein the processing further comprises applying a skip-gram algorithm to the feature embedding to generate corresponding feature prediction and classification.

9. The method of claim 7, wherein the transaction characteristic is a type of user feature shared by multiple users, and the transaction characteristic represents a transaction polarity, a zip code, a city, a state, an IP address, or a combination thereof.

10. A computing system, comprising:

an application server, the application server comprising a processor and a memory; and a database in communication with the processor and configured to store a plurality of transactions between users and merchants, the memory storing computer-executable instructions which are executed by the processor to cause the application server to:

process, based on a transaction characteristic, a plurality of feature datasets comprising transactions with corresponding user identifiers and merchant identifiers to generate a graph data structure comprising a plurality of interconnected transaction pairs;

process the graph data structure to determine a first-order transaction pair corresponding to a transaction frequency associated with a first user identifier, the first-order transaction pair comprising a first user node associated with the first user identifier and a first merchant node associated with a first merchant identifier;

process the graph data structure to determine a second set of transaction pairs from the first merchant node to one or more additional user nodes based on a ranking of transaction frequencies associated with the first merchant node to the one or more additional user nodes;

determine a second-order transaction pair from the first merchant node to a second user node based on each transaction frequency of the second set of transaction pairs and a corresponding predefined hyper-parameter; and generate a transaction sequence associated with the first user identifier by combining respective feature datasets associated with the first-order transaction pair and the second-order transaction pair.

11. The computing system of claim 10, wherein determining the second-order transaction pair comprises:

determining a set of jumping probability scores for the second set of transaction pairs based on each transaction frequency and the predefined hyper-parameter, each jumping probability scores for the second set of transaction pairs being determined by multiplying the predefined hyper-parameter by a square root of each respective transaction frequency of the corresponding transaction pair, the predefined hyper-parameter being represented by a value associated with one of a set of payment methods;

calculating a set of weighted frequency probability scores for the second set of transaction pairs based on each respective jump probability score and a sum of the set of the jumping probability scores; and determining, from the second set of the transaction pairs, the second-order transaction pair having a maximum standardized jumping probability score.

12. The computing system of claim 10, wherein the instructions are further executed by the processor to cause the application server to:

process the graph data structure to determine a third set of transaction pairs from the second user node to one or more additional merchant nodes based on respective transaction frequencies;

determine a third-order transaction pair from the second user node to a second merchant node based on each transaction frequency of the third set of the transaction pairs and the predefined hyper-parameter; and generate a second transaction sequence associated with the first user identifier by combining respective feature datasets associated with the first-order transaction pair, the second-order transaction pair and the third-order transaction pair.

13. The computing system of claim 10, wherein each transaction pair corresponds to a feature dataset and comprises a user node associated with a respective user identifier, a merchant node associated with a respective merchant identifier, and a connection band representing a corresponding transaction frequency.

14. The computing system of claim 10, wherein the instructions are further executed by the processor to cause the application server to:
execute an embedding model to transform the transaction sequence into a feature embedding;
index the feature embedding with the first user identifier; and
store the feature embedding in the database.

15. The computing system of claim 14, wherein the instructions are further executed by the processor to cause the application server to:
modify the transaction characteristic to process the feature datasets to generate a modified graph data structure comprising a plurality of modified transaction pairs;
process, based on a second user identifier, the modified graph data structure to determine at least two interconnected transaction pairs to generate a modified transaction sequence; and
execute the embedding model to transform the modified transaction sequence into a modified feature embedding.

16. The computing system of claim 15, wherein the instructions are further executed by the processor to cause the application server to apply a skip-gram algorithm to the feature embedding to generate corresponding feature prediction and classification.

17. The computing system of claim 15, wherein the transaction characteristic is a type of user feature shared by multiple users, and the transaction characteristic represents a transaction polarity, a zip code, a city, a state, an IP address, or a combination thereof.

18. A processor-implemented method comprising:
processing, based on a transaction characteristic, a plurality of feature datasets comprising transactions with corresponding user identifiers and merchant identifiers to generate a graph data structure comprising a plurality of interconnected transaction pairs;
processing the graph data structure to determine a first-order transaction pair corresponding to a transaction frequency associated with a first user identifier, the first-order transaction pair comprising a first user node associated with the first user identifier and a first merchant node associated with a first merchant identifier;
processing the graph data structure to determine a second set of transaction pairs from the first merchant node to one or more additional user nodes based on a ranking of transaction frequencies associated with the first merchant node to the one or more additional user nodes;
determining a second-order transaction pair from the first merchant node to a second user node based on each transaction frequency of the second set of transaction pairs;
generating a transaction sequence associated with the first user identifier by combining respective feature datasets associated with the first-order transaction pair and the second-order transaction pair and a corresponding predefined hyper-parameter;
executing an embedding model to transform the transaction sequence into a feature embedding; and
applying a machine learning model to the feature embedding to generate corresponding feature prediction and classification.

19. The method of claim 18, wherein determining the second-order transaction pair comprises:
determining a set of jumping probability scores for the second set of transaction pairs based on each transaction frequency and a predefined hyper-parameter, each jumping probability scores for the second set of transaction pairs being determined by multiplying the predefined hyper-parameter by a square root of each respective transaction frequency of the corresponding transaction pair;
calculating a set of weighted frequency probability scores for the second set of transaction pairs based on each respective jump probability score and a sum of the set of the jumping probability scores; and
determining, from the second set of the transaction pairs, the second-order transaction pair having a maximum standardized jumping probability score, wherein each transaction pair corresponds to a feature dataset and comprises a user node associated with a respective user identifier, a merchant node associated with a respective merchant identifier, and a connection band representing a corresponding transaction frequency.

20. The method of claim 19, wherein the predefined hyper-parameter is a value associated with one of a set of payment methods.

* * * * *